(12) United States Patent
Chang et al.

(10) Patent No.: US 11,347,948 B2
(45) Date of Patent: May 31, 2022

(54) TAMPER PROOF PAYMENT READER

(71) Applicant: Molex, LLC, Lisle, IL (US)

(72) Inventors: Tsuey Choo Lily Chang, Lisle, IL (US); Yan Pan, Aurora, IL (US); Steven Zeilinger, Goodrich, MI (US)

(73) Assignee: Molex, LLC, Lisle, IL (US)

( * ) Notice: Subject to any disclaimer, the term of this patent is extended or adjusted under 35 U.S.C. 154(b) by 434 days.

(21) Appl. No.: 16/478,850

(22) PCT Filed: Mar. 29, 2018

(86) PCT No.: PCT/US2018/025014
§ 371 (c)(1),
(2) Date: Jul. 18, 2019

(87) PCT Pub. No.: WO2018/183597
PCT Pub. Date: Oct. 4, 2018

(65) Prior Publication Data
US 2021/0303805 A1 Sep. 30, 2021

Related U.S. Application Data

(60) Provisional application No. 62/644,083, filed on Mar. 16, 2018, provisional application No. 62/478,861, filed on Mar. 30, 2017.

(51) Int. Cl.
*G06K 7/00* (2006.01)
*G06F 21/86* (2013.01)
(Continued)

(52) U.S. Cl.
CPC .......... *G06K 7/0021* (2013.01); *G06F 21/86* (2013.01); *G06Q 20/34* (2013.01); *H05K 1/0296* (2013.01);
(Continued)

(58) Field of Classification Search
None
See application file for complete search history.

(56) References Cited

U.S. PATENT DOCUMENTS 9,578,763 B1 2/2017 Wade
9,591,776 B1 3/2017 Brodsky et al.
(Continued)

FOREIGN PATENT DOCUMENTS

JP 2000-150685 A 5/2000
JP 2008-547240 A 12/2008
(Continued)

OTHER PUBLICATIONS

Extended European search report and opinion received for EP application No. 18775689.5, dated Nov. 6, 2020, 8 pages.
(Continued)

*Primary Examiner* — Kristy A Haupt

(57) ABSTRACT

A payment reader is provided for use in a payment system. The payment reader includes a housing, a non-conductive cover covering the housing and forming an internal compartment, electronic circuitry within the internal compartment and surrounded by the cover, and a mesh of conductive traces provided on the cover and in communication with the electronic circuitry. The cover has an upper wall and interconnected side walls depending downwardly from the upper wall. The lower surface of the upper wall which faces the internal compartment has its entire surface area which is formed of at least one three-dimensional shape which extends outwardly from an x-y plane in the z-direction.

20 Claims, 15 Drawing Sheets

(51) Int. Cl.
*G06Q 20/34* (2012.01)
*H05K 1/02* (2006.01)

(52) U.S. Cl.
CPC .............. *H05K 2201/09045* (2013.01); *H05K 2201/0999* (2013.01); *H05K 2201/09236* (2013.01)

(56) References Cited

U.S. PATENT DOCUMENTS

| | | | |
|---|---|---|---|
| 10,127,409 B1* | 11/2018 | Wade | G06F 21/86 |
| 10,595,400 B1* | 3/2020 | Razaghi | H05K 1/0275 |
| 2008/0284610 A1 | 11/2008 | Hunter | |
| 2009/0065591 A1 | 3/2009 | Paul et al. | |
| 2013/0283386 A1 | 10/2013 | Lee | |
| 2015/0097572 A1* | 4/2015 | Wade | G06K 7/10257 |
| | | | 324/537 |

FOREIGN PATENT DOCUMENTS

| | | |
|---|---|---|
| JP | 2009-093401 A | 4/2009 |
| JP | 2009-193119 A | 8/2009 |
| JP | 2013-003979 A | 1/2013 |
| KR | 10-2001-0057804 A | 7/2001 |
| KR | 20030090959 A | 12/2003 |
| KR | 10-2008-0105500 A | 12/2008 |
| WO | 2014/018281 A1 | 1/2014 |
| WO | 2018/183597 A1 | 10/2018 |

OTHER PUBLICATIONS

Decision to Grant received for JP application No. 2019-540535, dated Sep. 29, 2020, 5 pages (2 pages of English translation and 3 pages of official copy).

International Search Report and Written Opinion received for PCT application No. PCT/US2018/025014, dated Jul. 17, 2018, 7 pages.

\* cited by examiner

TAMPER PROOF PAYMENT READER

RELATED APPLICATIONS

This application claims priority to PCT Application No. PCT/US2018/25014, filed on Mar. 29, 2018 which further claims the domestic priority of U.S. provisional application Ser. No. 62/478,861, filed on Mar. 30, 2017 and U.S. provisional application Ser. No. 62/644,083, filed on Mar. 16, 2018, the contents of which are incorporated herein in their entirety.

TECHNICAL FIELD

This disclosure relates to the field of payment readers for use in point of sale devices.

BACKGROUND ART

A point of sale device or an electronic payment terminal, such as a payment reader, may interface with various types of payment devices. Examples of such payment devices include a credit card having magnetic stripe, a credit card having an EMV chip, or a near field communication-enabled (NFC-enabled) electronic device, such as a smart phone running a payment application. With each of these payment devices, there are multiple opportunities for a violator to attempt to obtain the payment information in order to steal payment data or otherwise engage in fraudulent transactions. Accordingly, numerous types of tamper detection techniques exist.

Current payment reader in the market include a housing formed primarily of a molded flat plastic cover with conductive traces laid in a mesh which cover the electronic circuitry in the electronic payment terminals. A violator may attempt to acquire payment information by gaining access to components of the payment terminal by modifying the payment terminal to eavesdrop or inject malicious signals. The mesh is connected to an electrical power source and to a detector within the payment reader. Attempts to physically access the electronic circuitry will likely damage the mesh to the extent of causing an open circuit condition in the mesh. The detector detects this open circuit condition as tampering, and can trigger an appropriate countermeasure in response. While such a mesh provides some degree of tampering protection, it is possible for a determined violator to circumvent it. For example, given the time for careful inspection, a violator could succeed in isolating a portion of the electronic circuitry from the mesh or opening the payment reader without necessarily damaging the mesh. Flat surfaces are relatively easy to tamper with. Violators have been known to grind through the plastic housing from the outer surface of the housing to the conductive mesh, and then peel the mesh away from the housing.

U.S. Pat. No. 9,578,763 discloses a technique for tamper detection in an electronic device by use of an internal power supply signal. The technique includes electrically coupling a conductive trace, in series via a resistor, to an internal power supply that supplies power to a security module within a processor of the device. The technique further includes electrically coupling the power supply to a detector for use in tamper detection on the trace. Upon occurrence of a short-circuit condition on the conductive trace, substantially all voltage of the local power supply is dropped across the resistor. As a result, the detector detects a drop in voltage below a predetermined threshold, and perceives such drop as a "collapse" of the internal power supply. The collapse of the power supply is indicative of a tampering event to the detector, which in response, outputs a signal to disable an operation of the security module.

It would be beneficial to modify the structure of the cover to further deter attacks.

SUMMARY

A payment reader is provided for use in a payment system. The payment reader includes a housing, a cover covering the housing and forming an internal compartment, electronic circuitry within the internal compartment and surrounded by the cover, and a mesh of conductive traces provided on the cover and in communication with the electronic circuitry. The cover has an upper wall and interconnected side walls depending downwardly from the upper wall. The lower surface of the upper wall which faces the internal compartment has its entire surface area which is formed of at least one three-dimensional shape which extends outwardly from an x-y plane in the z-direction. In some embodiments, the at least one three-dimensional shape is formed as a bump or a plurality of bumps. In an embodiment, the at least one three-dimensional shape is formed as a plurality of undulating convex and concave surfaces.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

DETAILED DESCRIPTION OF THE PREFERRED EMBODIMENTS

Figure 1:
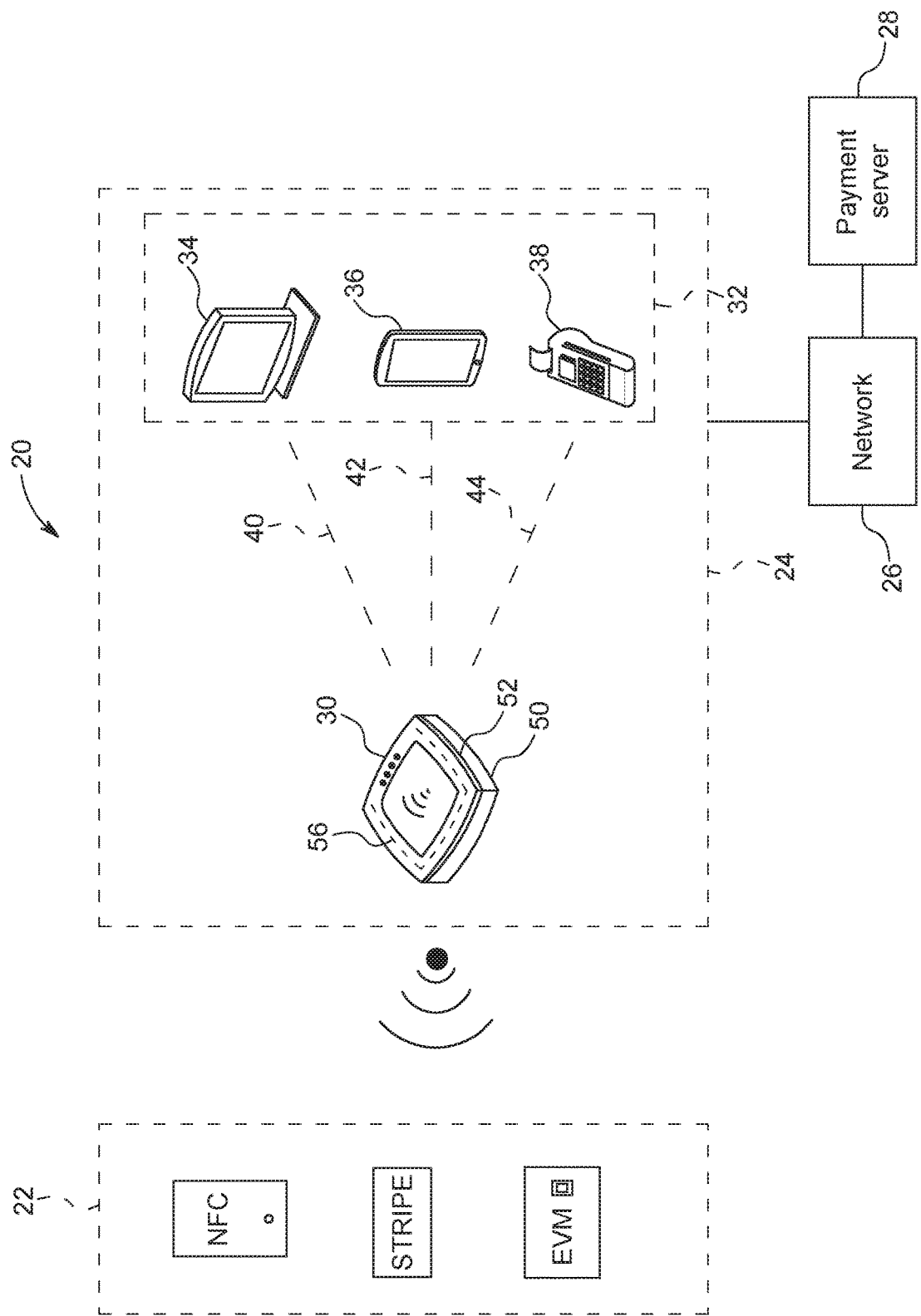
FIG. 1 is a schematic representation of a payment system.

FIG. 1 depicts an illustrative block diagram of a payment system 20 in accordance with some embodiments of the present disclosure. In an embodiment, the payment system 20 includes a customer's payment device 22, a merchant's point of sale device or payment terminal 24, a network 26, and a payment server 28. These components of the payment system 20 facilitate electronic payment transactions between a merchant and a customer. In one embodiment, the merchant's payment terminal 24 includes a payment reader 30 and a merchant device 32. The merchant device 32 runs a point-of-sale application that provides a user interface for the merchant and facilitates communication with the payment reader 30 and the payment server 28. The merchant device 32 may be any suitable device such as tablet payment device 34, mobile payment device 36, or payment terminal 38. In the case of a computing device such as tablet payment device 34 or mobile payment device 36 a point-of-sale application may provide for the entry of purchase and payment information, interaction with a customer, and communications with a payment server 28. The merchant device 32 may be in communication with the payment reader 30 via a communication path 40/42/44 which may be implemented via a wired (e.g., Ethernet, USB, FireWire, Lightning), wireless (e.g., Wi-Fi, Bluetooth, NFC, or ZigBee) connection, Bluetooth low energy interface. The payment terminal 24 is capable of processing payment information (e.g., encrypted payment card data and user authentication data) and transaction information (e.g., purchase amount and point-of-purchase information), such as a smart phone or tablet running a payment application. The customer has a payment device 22, such as a credit card having magnetic stripe, a credit card having an EMV chip, or a NFC-enabled (near field communication) electronic device such as a smart phone running a payment application.

The electronic interactions between the merchant and the customer take place between the customer's payment device 22 and the merchant's payment terminal 24. In some embodiments, for low-value transactions or for payment transactions that are less than a payment limit indicated by a NFC or EMV payment device 22, the initial processing and approval of the payment transaction may be processed at the merchant's payment terminal 24. In other embodiments, the merchant's payment terminal 24 may communicate with the payment server 28 over the network 26. The merchant's payment terminal 24 and the payment server 28 communicate payment and transaction information to determine whether the transaction is authorized.

The payment reader 30 includes a housing 50, a non-conductive cover 52 covering an upper end of the housing 50, a mesh 54 of conductive traces attached to the cover 52 and in communication with electronic circuitry 56 surrounded by the cover 52. The cover 52 may be formed of plastic. Such electronic circuitry 56 is known and may include one or more circuit boards, where the circuit boards contain various electrical components that carry out the functions of the payment reader 30, such as a reader chip, a plurality of payment interfaces, a power supply, a wireless communication interface, a wired communication interface. The term mesh 54 as used herein refers to one or more conductive traces that may be, but are not necessarily, electrically coupled to each other, and which are electrically coupled to the electronic circuitry 56. In some embodiments, a plurality of conductive traces 58a, 58b are interwoven together to form the mesh 54. The different interwoven conductive traces 58a, 58b can run very closely together, along spatially parallel paths. In some embodiments, the conductive traces 58a, 58b are 0.25 mm apart. In some embodiments, the conductive traces 58a, 58b are 0.40 mm apart. In embodiments, the conductive traces 58a, 58b are provided by a flex circuit, laser direct structuring (LDS) technology or other additive conductive ink processes.

In some embodiments, the payment reader 30 also includes an EMV slot that is capable of receiving chip card. The payment reader 30 may also include hardware for interfacing with a magnetic strip card. In some embodiments, the hardware may include a slot that guides a customer to swipe or dip the magnetized strip of the magnetic strip card such that a magnetic strip reader can receive payment information from the magnetic strip card. The received payment information is then processed by the payment reader 30. While two conductive traces 58a, 58b are described and illustrated, it is to be understood that more conductive traces could be provided.

The cover 52 includes an upper wall 60 and four interconnected side walls 62, 64, 66, 68 depending downwardly from the perimeter of the upper wall 60, thereby defining an internal compartment 70 therein which holds the electronic circuitry 56. The upper wall 60 has an upper surface 60a and has an opposite lower surface 60b. In some embodiments, the upper surface 60a is planar. Each side wall 62, 64, 66, 68 has an upper surface 62a, 64a, 66a, 68a, an opposite lower surface 62b, 66b (not shown for side walls 64, 68), an outer side surface 62c, 64c, 66c, 68c, and an opposite inner side surface 62d, 64d, 66d, 68d (these side wall surfaces are only labeled in FIGS. 2-4). The inner side surfaces 62d, 64d, 66d, 68d face into the internal compartment 70. In some embodiments, the upper surfaces 62a, 64a, 66a, 68a, the lower surfaces 62b, 64b, 66b, 68b, and the outer side surface 62c, 64c, 66c, 68c are planar. In an embodiment, the side walls 62, 64, 66, 68 are perpendicular to the upper wall 60. In some embodiments, the side walls 62, 64, 66, 68 are angled relative to the upper wall 60 at angles greater than 0 degrees and less than 180 degrees.

A coordinate system is labeled in the drawings. The cover 52 extends a width along an x-axis of the coordinate system between side wall 62 and side wall 66, a length along a y-axis of the coordinate system between side wall 64 and side wall 68, and a height along a z-axis of the coordinate system which extends from the upper surface 60a of the upper wall 60 to the lower surface 60b of the upper wall 60, such that the x-axis, the y-axis and the z-axis are perpendicular to each other. The lower surface 60b of the upper wall 60 defines a z-axis boundary of the internal compartment 70 and the side walls 62, 64, 66, 68 define x-axis and y-axis boundaries of the internal compartment 70. The upper and lower surfaces 60a, 60b of the upper wall 60 intersect the z-axis and in the following description, the direction extending between the upper and lower surfaces 60a, 60b of the upper wall 60 is defined as the z-axis direction, and the upper wall 60 has an x-y plane defined along the x-axis and the y-axis. In an embodiment, the planar upper surface 60a defines the x-y plane.

The entire surface area forming the lower surface 60b of the upper wall 60 is formed of at least one three-dimensional shape which extends outwardly from the x-y plane in the z-direction. The at least one three-dimensional shape can take a variety of shapes and forms and the drawings show illustrative examples of such three-dimensional shapes.

Figure 2:
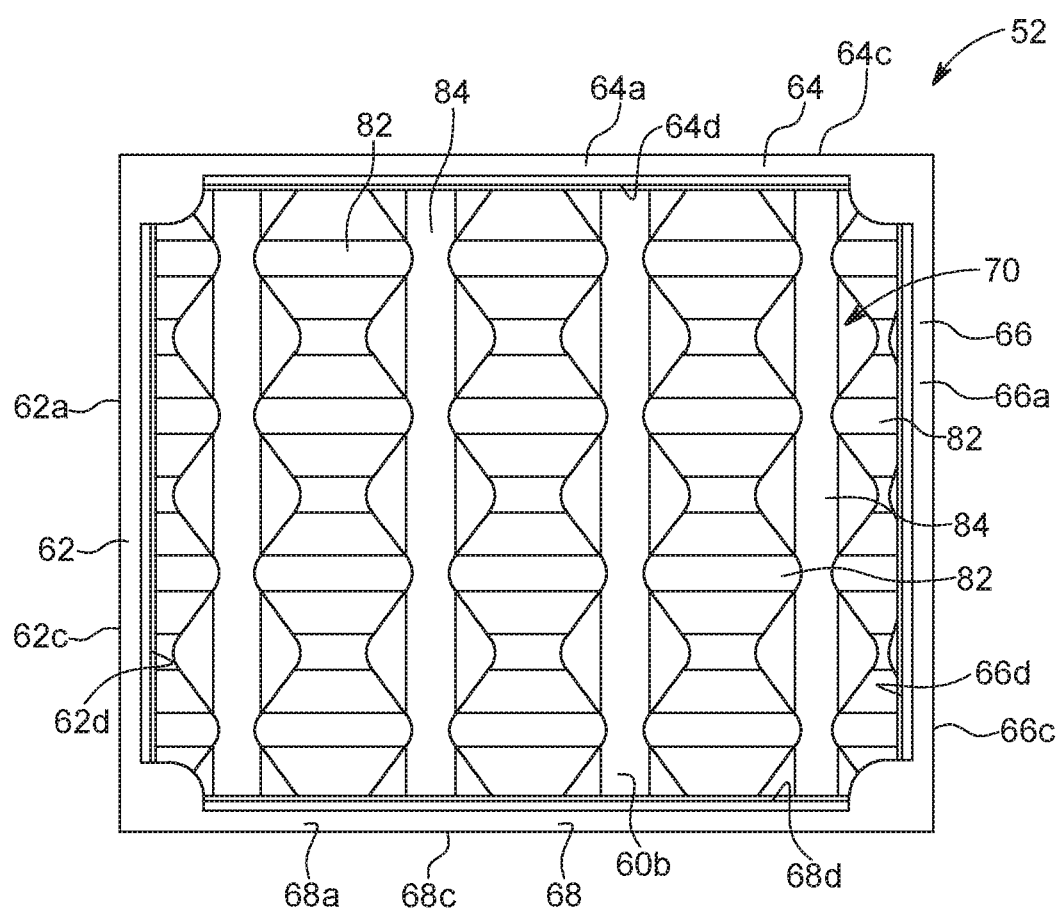
FIG. 2 is bottom plan view of an embodiment of a cover of a payment reader which forms a component of the payment system.
Figure 3:
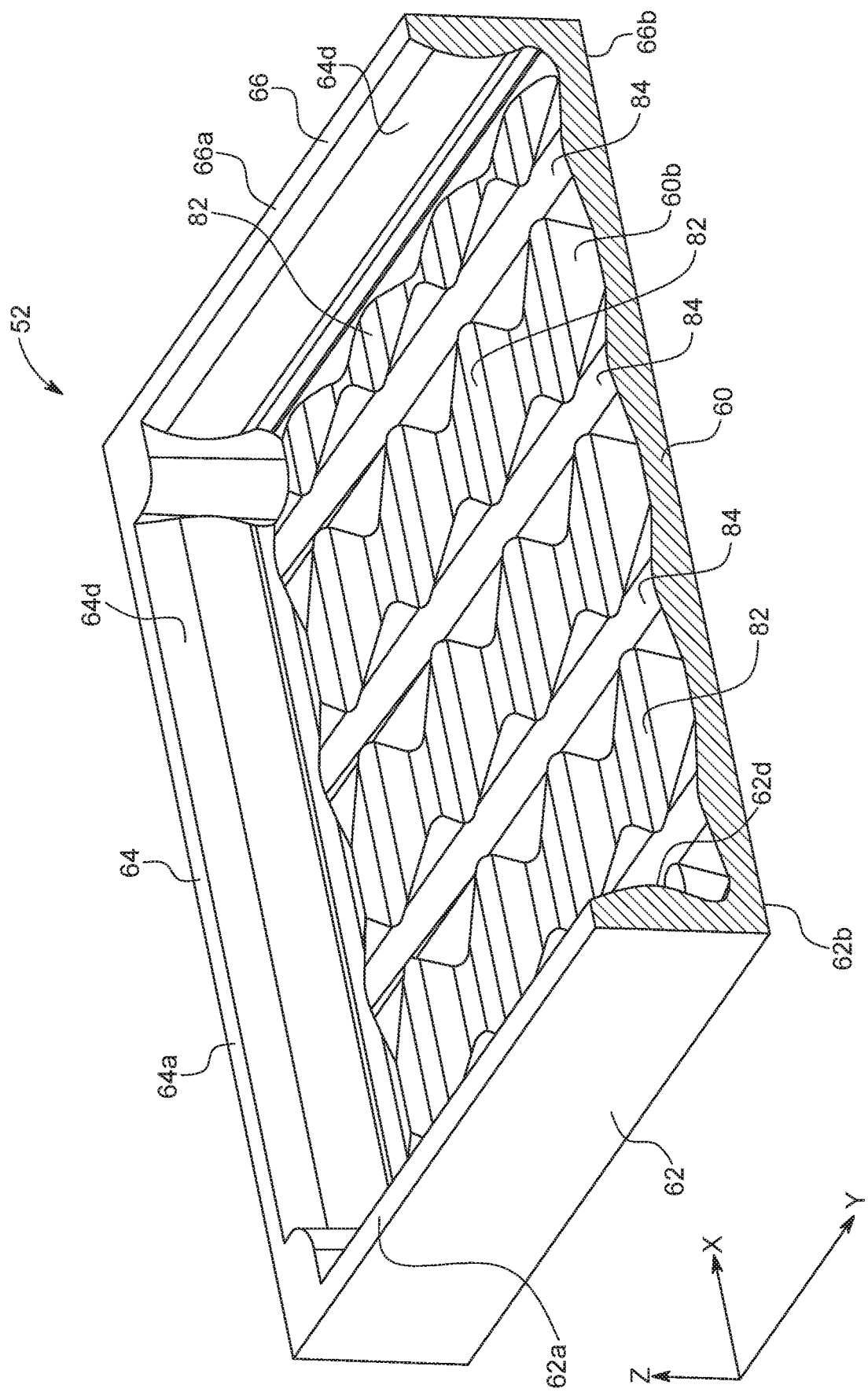
FIG. 3 is a partial perspective plan view of the cover of FIG. 2.
Figure 4:
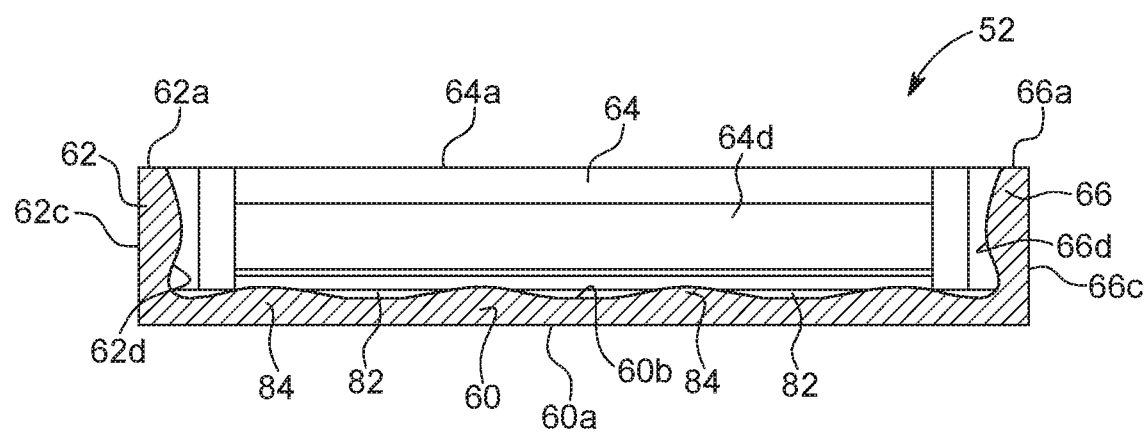
FIG. 4 is a cross-sectional view of the cover of FIG. 2.

In an embodiment as shown in FIGS. 2-4, a plurality of three-dimensional shapes are provided and are formed as bumps 82, 84.

In the illustrative embodiment shown in FIGS. 2-4, each bump 82, 84 is formed from a continuous surface which is curved in a convex shape or generally convex shape relative to the x-y plane. The bumps 82 are side-by-side in a row, and extend along the length of the cover 52 to form columns. The surfaces between adjacent bumps 82 merge smoothly with each other at adjacent edges thereof along a vertex or at a tangent line. Each bump 84 extends along the width from side wall 64 to side wall 68. Bumps 84 separate the rows of bumps 82 from each other. Generally, the bumps 82, 84 form an array of rows and columns. The surfaces forming each bump 82 merge smoothly with the surfaces forming the bumps 84 at adjacent edges thereof along a vertex or at a tangent line. As shown in FIG. 2, the bumps 82 have horizontal lines thereon which shows that the curvature extends in a first direction and the bumps 84 have vertical lines thereon which shows that the curvature extends in a second, perpendicular direction. In the illustrative embodiment, the bumps 82' which are adjacent to the side walls 62, 64, 66, 68 are only partially formed and are cutout off by the side walls 62, 64, 66, 68.

In an embodiment, the bumps 82 have the same surface area. In an embodiment, the surface areas of the bumps 82 vary. As an example, some of the bumps 82 have a first surface area, and some of the bumps 82 have a second surface area, and so forth. As an example, each bump 82 has a surface area which is different. In an embodiment, all of the bumps 82 extend the same distance in the z-direction. In an embodiment, some of the bumps 82 extend a first distance in the z-direction, and some of the bumps 82 extend a second distance in the z-direction, and so forth. In an embodiment, each bump 82 extends a different distance in the z-direction.

In an embodiment, the bumps 84 have the same surface area. In an embodiment, the surface areas of the bumps 84 vary. As an example, some of the bumps 84 have a first surface area, and some of the bumps 84 have a second surface area, and so forth. As an example, each bump 84 has a surface area which is different. In an embodiment, all of the bumps 84 extend the same distance in the z-direction. In an embodiment, some of the bumps 84 extend a first distance in the z-direction, and some of the bumps 84 extend a second distance in the z-direction, and so forth. In an embodiment, each bump 84 extends a different distance in the z-direction.

Figure 6:
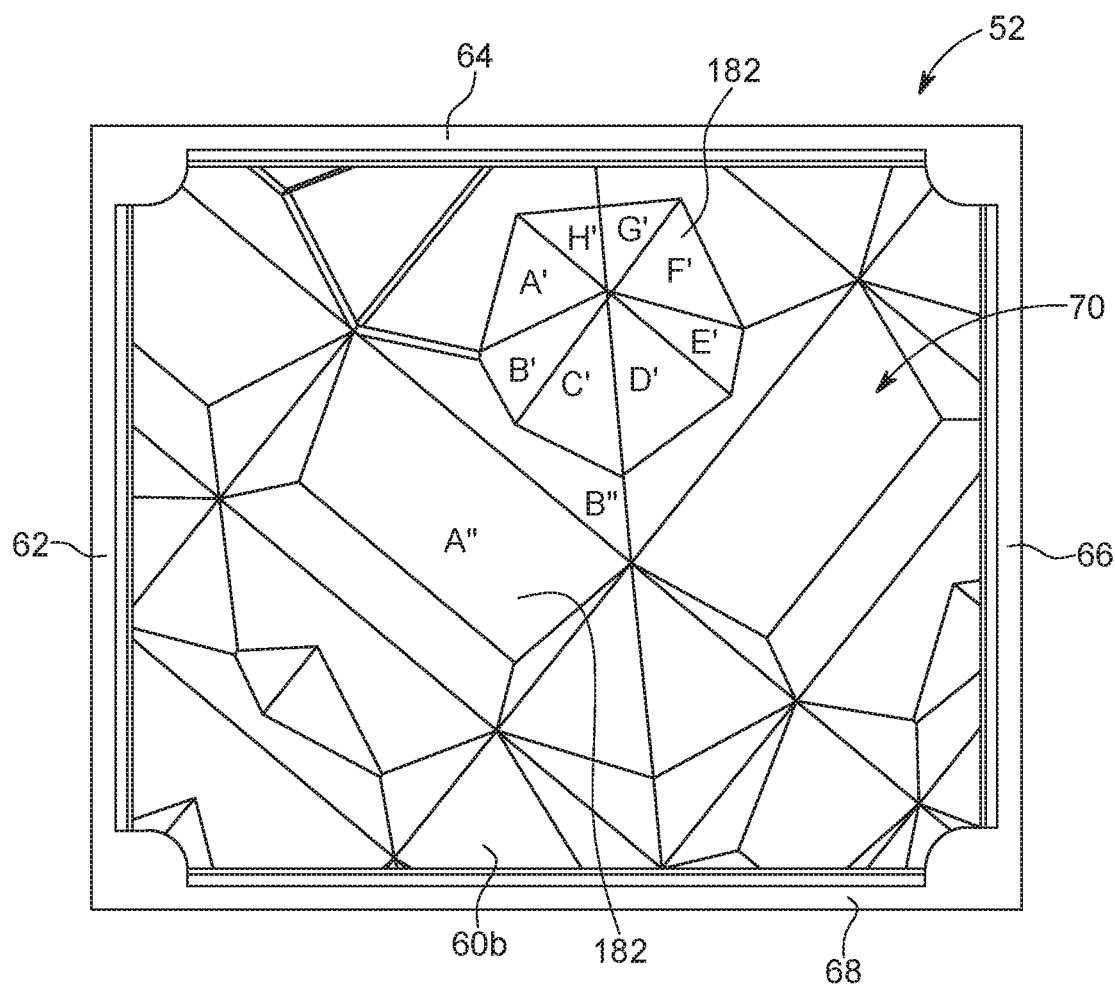
FIG. 6 is bottom plan view of another embodiment of a cover of a payment reader which forms a component of the payment system.
Figure 7:
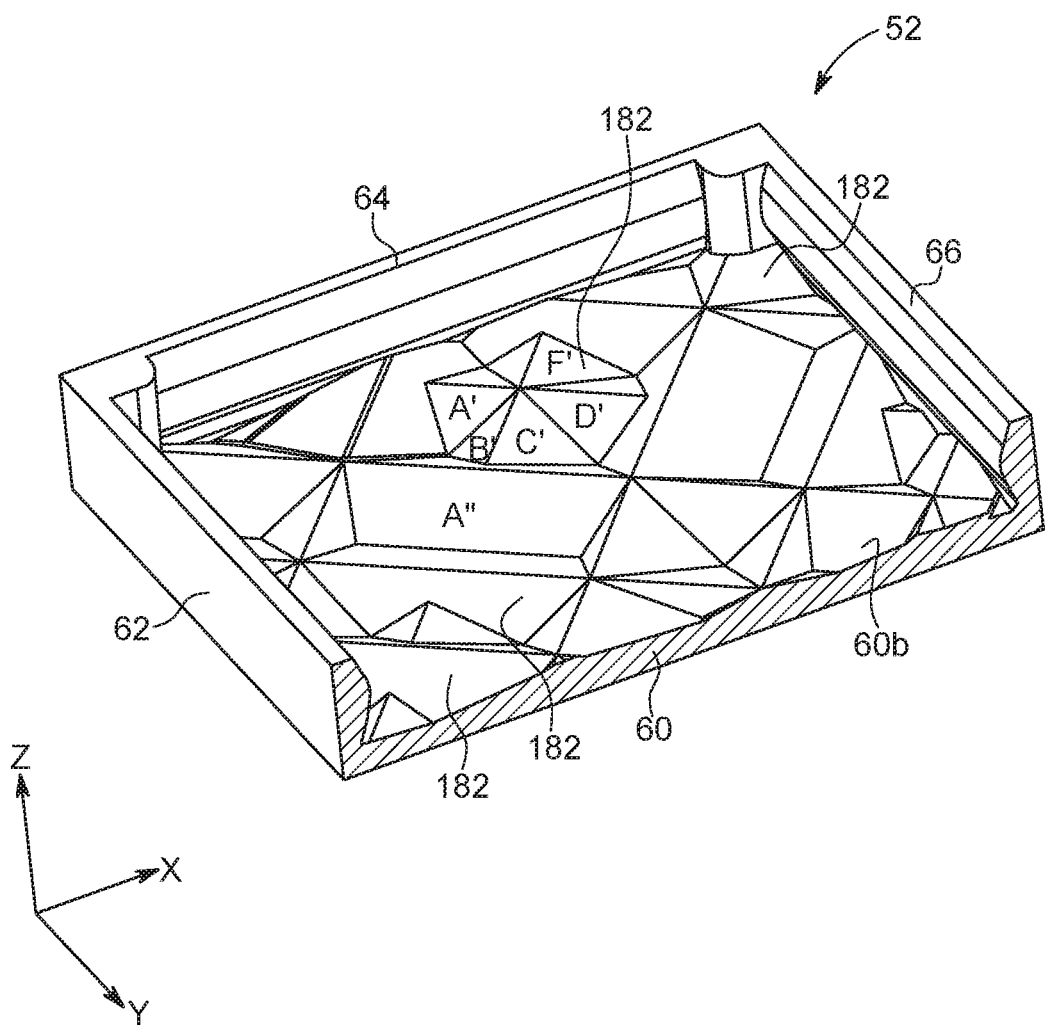
FIG. 7 is a partial perspective plan view of the cover of FIG. 6.
Figure 8:
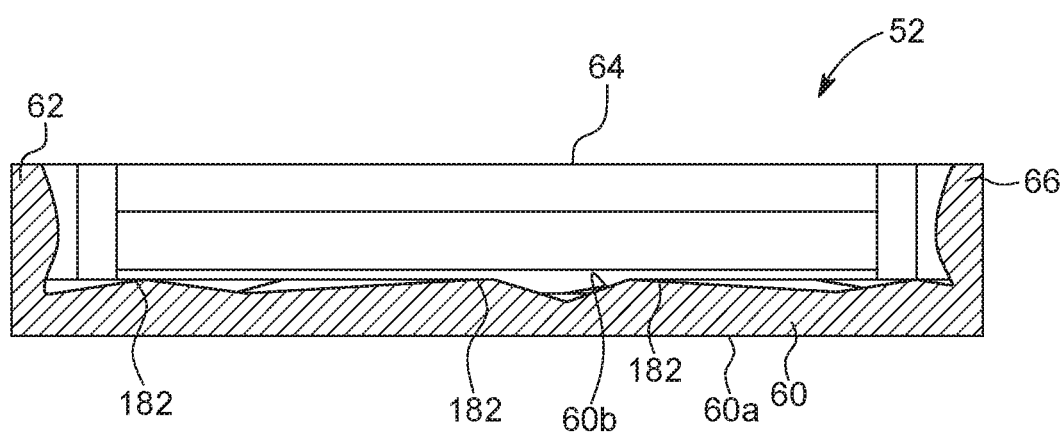
FIG. 8 is a cross-sectional view of the cover of FIG. 6.
Figure 9:
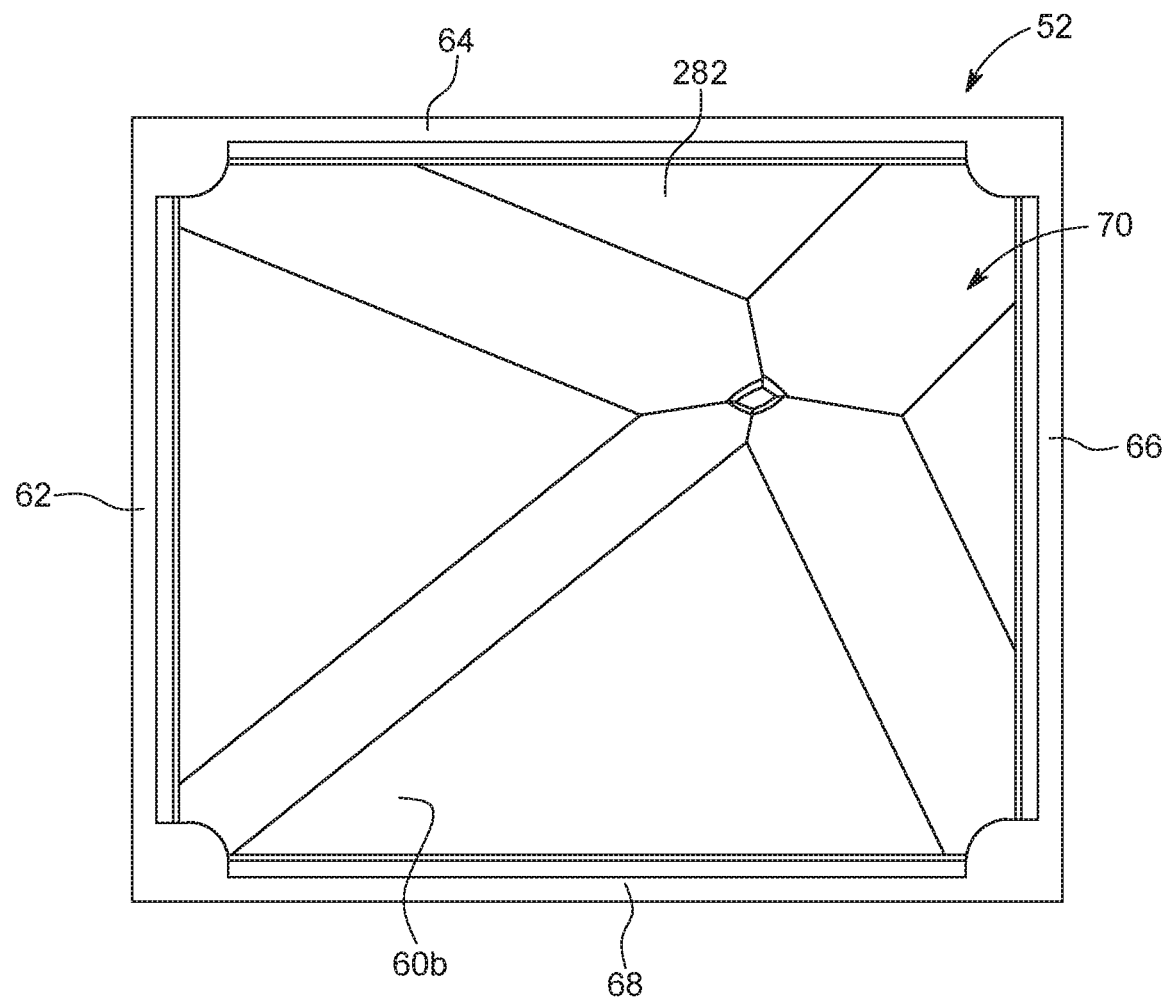
FIG. 9 is bottom plan view of a further embodiment of a cover of a payment reader which forms a component of the payment system.
Figure 10:
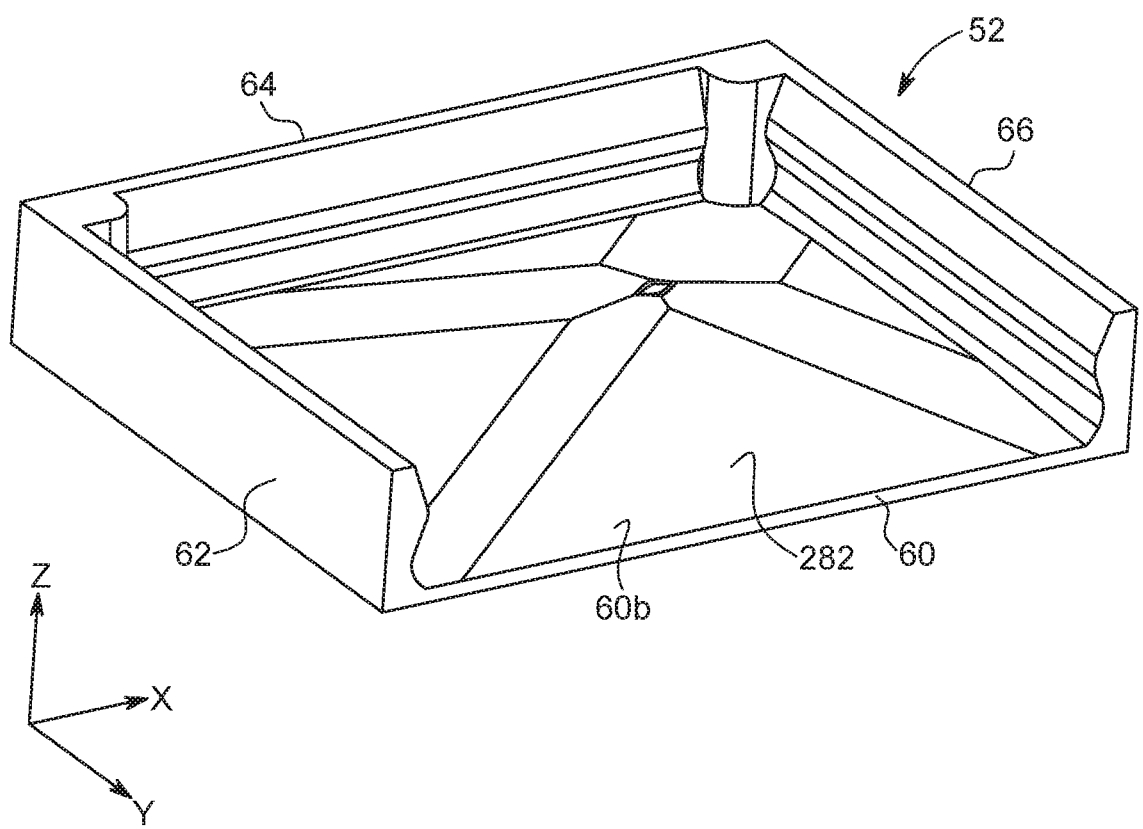
FIG. 10 is a partial perspective plan view of the cover of FIG. 9.
Figure 11:
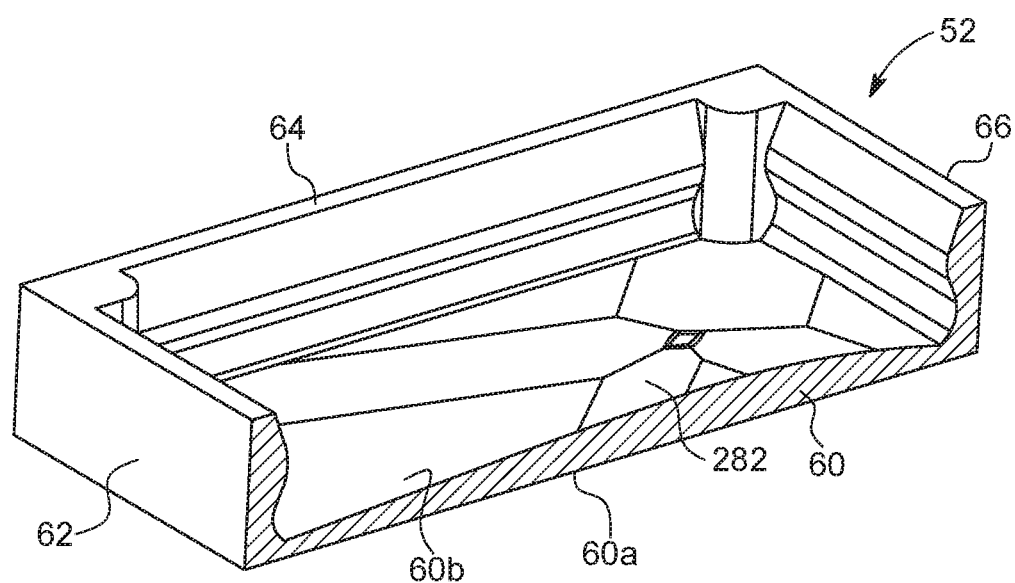
FIG. 11 is another partial perspective plan view of the cover of FIG. 9.
Figure 12:
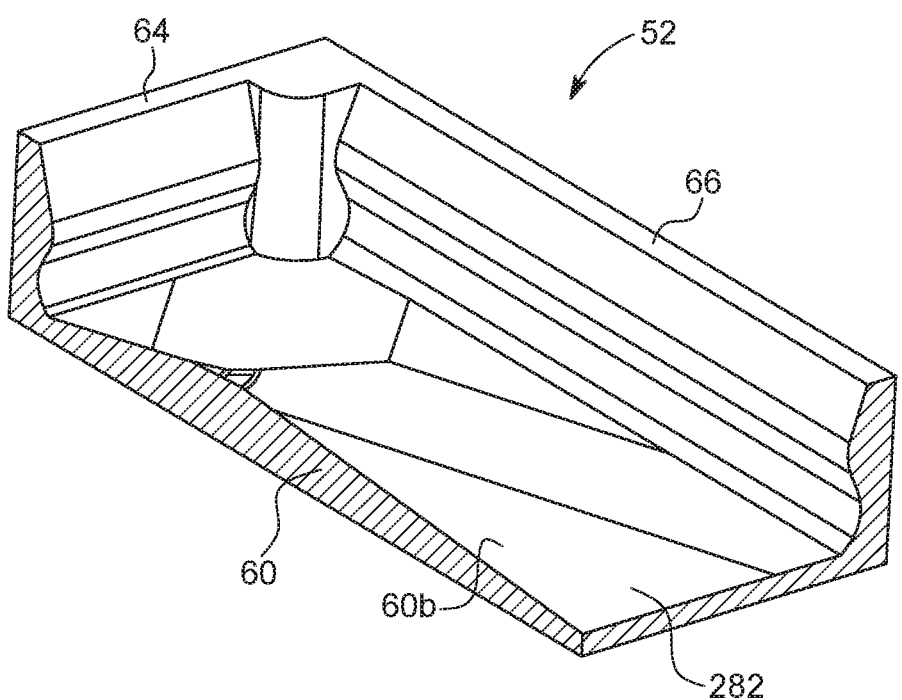
FIG. 12 is a further partial perspective plan view of the cover of FIG. 9.

In an embodiment as shown in FIGS. 6-8, a plurality of three-dimensional shapes are provided and are formed as surfaces 182, each of which is angled relative to each other, each of which is angled relative to the z-axis, and each of which is angled relative to the x-y plane. The surfaces 182 are randomly formed on the lower surface 60b. As shown in the illustrative embodiment in FIG. 6, surfaces 182 generally form a bump and has eight surfaces which are labeled as A', B', C', E', F', G', H', each of which is angled relative to each other. As shown in the illustrative embodiment in FIG. 6, surfaces 182 which are labeled as A", B" are angled relative to each other and are angled relative to surfaces A', B', C', E', F', G', H'.

Adjacent surfaces 182 merge smoothly with each other and meet at a vertex or at a tangent line. The surfaces 182 may be formed from planar surfaces, may be formed from surfaces which are curved and are either concave or generally concave or convex or generally convex. A combination of any of these surfaces can be used.

In an embodiment, the surfaces 182 have the same surface area. In an embodiment, the surface areas of the surfaces 182 vary. As an example, some of the surfaces 182 have a first surface area, and some of the surfaces 182 have a second surface area, and so forth. As an example, each surface 182 has a surface area which is different.

In an embodiment, all of the surfaces 182 extend the same distance in the z-direction. In an embodiment, some of the surfaces 182 extend a first distance in the z-direction, and some of the surfaces 182 extend a second distance in the z-direction, and so forth. In an embodiment, each surface 182 extends a different distance in the z-direction.

In an embodiment as shown in FIGS. 9-12, a single three-dimensional shape is provided and is formed as a mound or bump 282. The bump 282 may be formed of a single surface which is curved, or may be formed of a plurality of surfaces which merge smoothly with each other and each of which meet at a vertex or at a tangent line. If formed of a plurality of surfaces, the surfaces forming the bump 282 may be formed from planar surfaces, each of which is angled relative to each other, angled relative to the z-axis, and angled relative to the x-y plane, may be formed from surfaces which are curved, either as concave, generally concave, convex or generally convex shapes, relative to the x-y plane and at an angle relative to the z-axis, may be formed of a combination of the planar and curved surfaces.

Figure 13:
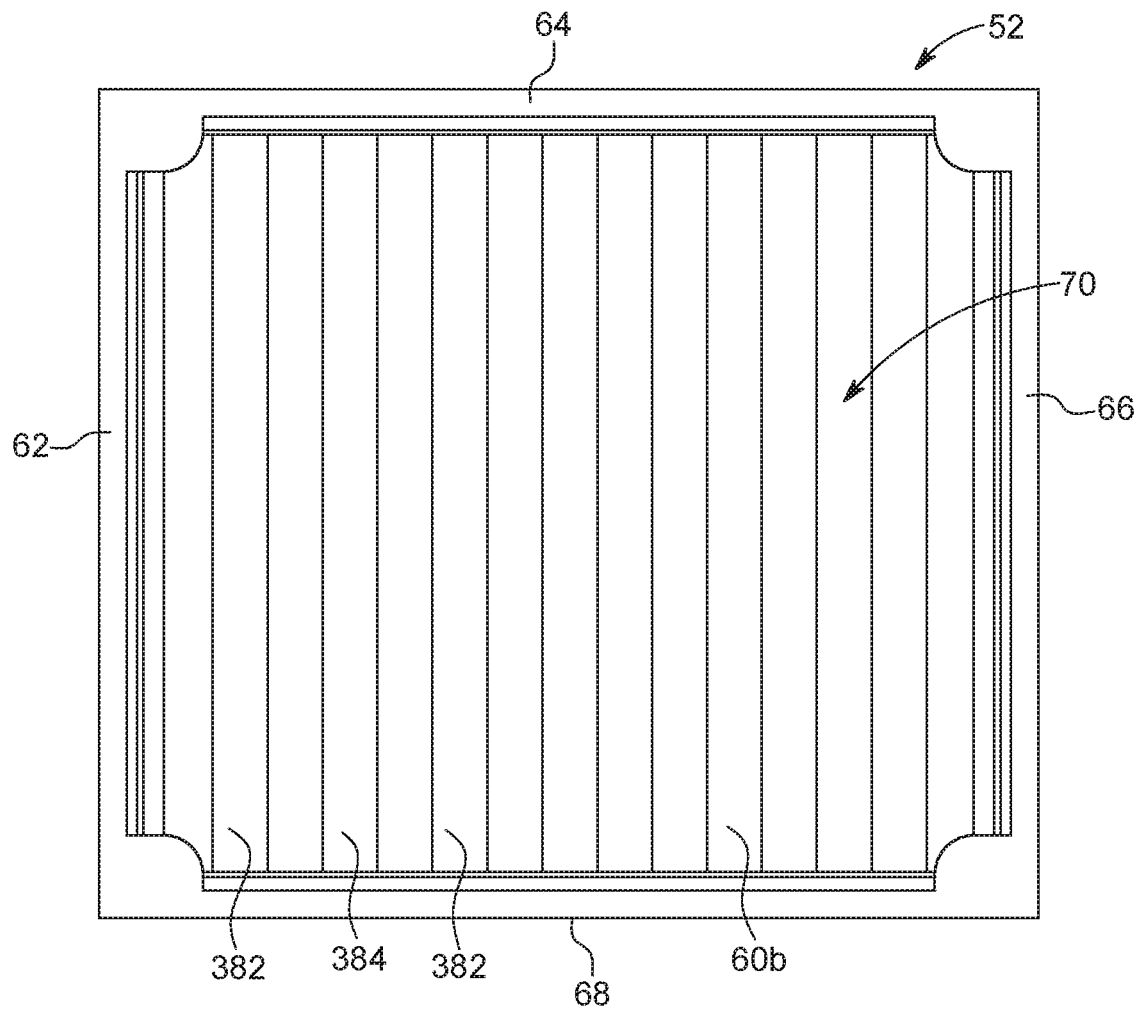
FIG. 13 is bottom plan view of yet another embodiment of a cover of a payment reader which forms a component of the payment system.
Figure 14:
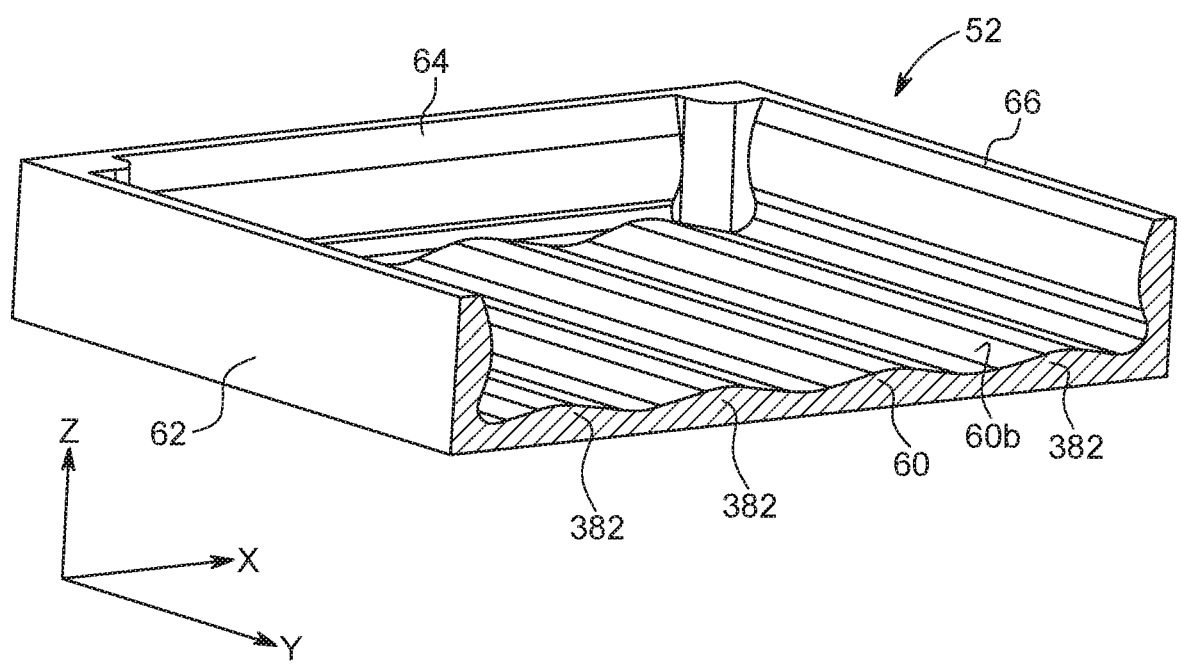
FIG. 14 is a partial perspective plan view of the cover of FIG. 13.
Figure 15:
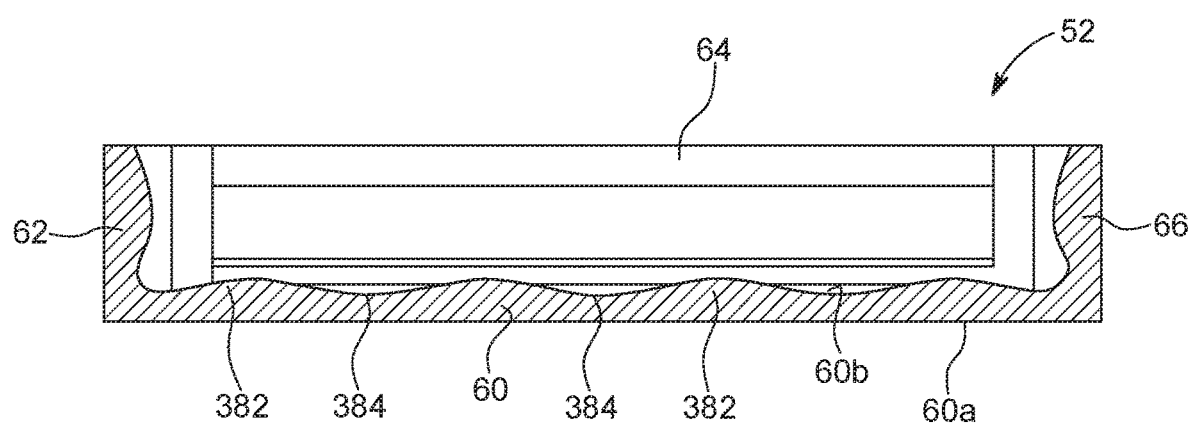
FIG. 15 is a cross-sectional view of the cover of FIG. 14.

In an embodiment as shown in FIGS. 13-15, the three-dimensional shapes are formed in an undulating pattern and include a plurality of surfaces 382 which are convex or curved in a generally convex shape which extend along the length of the upper wall 60 between side wall 64 and side wall 68 (side wall 68 is not shown in FIGS. 14 and 15) and a plurality of surfaces 384 which are concave or curved in a generally concave shape which extend along the length of the upper wall 60 between side wall 64 and side wall 68, the surfaces 382, 384 alternating with each other in the direction of the width of the cover 52 between side wall 62 and side wall 66. The surfaces 382 are curved relative to the x-y plane. The surfaces 384 are curved relative to the x-y plane. The surfaces 382 merge smoothly with the surfaces 384 at their adjacent edges along tangents.

In an embodiment, the surfaces 382, 384 have the same surface area. In an embodiment, the surface areas of the surfaces 382, 384 vary. As an example, some of the surfaces 382, 384 have a first surface area, and some of the surfaces 382, 384 have a second surface area, and so forth. As an example, each surface 382, 384 has a surface area which is different.

In an embodiment, all of the surfaces 382 extend the same distance in the z-direction. In an embodiment, some of the surfaces 382 extend a first distance in the z-direction, and some of the surfaces 382 extend a second distance in the z-direction, and so forth. In an embodiment, each surface 384 extends a different distance in the z-direction. In an embodiment, all of the surfaces 384 extend the same distance in the z-direction. In an embodiment, some of the surfaces 384 extend a first distance in the z-direction, and some of the surfaces 384 extend a second distance in the z-direction, and so forth. In an embodiment, each surface 384 extends a different distance in the z-direction.

It is to be understood that the embodiments shown in the drawings are examples of three-dimensional shapes that may be formed on the lower surface 60b and that a multitude of other three-dimensional shapes may be formed on the inner surface 60. In an embodiment, a single three-dimensional shape is formed on the entire surface area of the lower surface 60b of the upper wall 60 which extends outwardly from the x-y plane in the z-direction.

Figure 5:
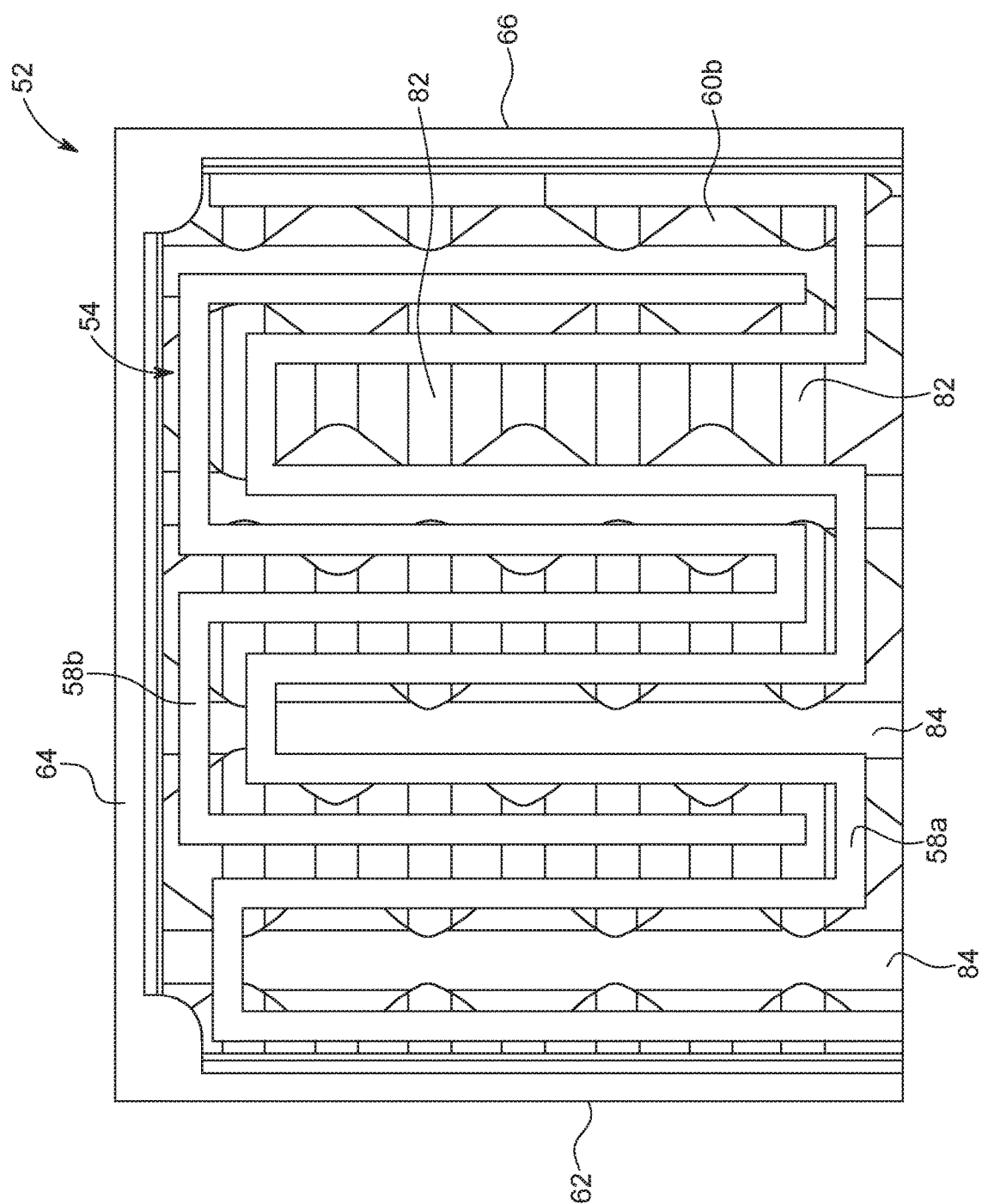
FIG. 5 is bottom plan view of the cover of FIG. 2 with a mesh provided thereon.

The mesh 54 is provided on the lower surface 60b of the cover 60 and overlays portions of the three-dimensional shapes. As illustrated in FIG. 5 which shows the embodiment of the cover 52 shown in FIGS. 2-4, the mesh 54 may be formed as a plurality of traces 58a, 58b, each in communication with the electronic circuitry 56. In an embodiment, the traces 58a, 58b are provided in a serpentine pattern, but this is illustrative and other patterns may be provided. Because the lower surface 60b has the three-dimensional shapes formed thereon, if a violator grinds the upper surface 60a of the upper wall 60 from the upper surface 60a toward the lower surface 60b, the violator will not be able to expose the entire surface of the mesh 54 at the same time, nor will the violator be able to expose a substantial portion of the mesh 54 at the same time, since only parts of the mesh 54 will be exposed as the upper wall 60 is ground down. As a result, the mesh 54 cannot be peeled away from the upper wall 60, nor can a violator easily determine where to drill between the adjacent traces 58a, 58b in the mesh 54. While the mesh 54 is only shown in the drawings in association with the embodiment of the cover 52 shown in FIGS. 2-4 in FIG. 5, it is to be understood that a mesh 54 is provided on the embodiments of the cover 52 shown in FIGS. 6-15.

In an embodiment, an overlay (not shown) is provided on the lower surface of the mesh 54 and the exposed lower surfaces 60b of the three-dimensional shapes. In an embodiment, the overlay has a secondary mesh (not shown) formed on its lower surface which is in communication with the electronic circuitry 56. The secondary mesh on the overlay may be formed in a pattern that is different than the pattern the first mesh 54 is provided in, such that if a violator attempts to drill between the spaces in the pattern of the first mesh 54, that the violator then interrupts the second pattern.

The entire surface area of the inner side surfaces 62d, 66d of side walls 62, 66 may have at least one three-dimensional shape formed thereon which extends outwardly from a y-z plane in the x-axis direction, and the entire surface area of the inner side surfaces 64d, 68d of side walls 64, 68 may have three-dimensional shapes formed thereon which extend outwardly from a x-z plane in the y-axis direction. The three-dimensional shapes on the inner side surfaces 62d, 64d, 66d, 68d of the side walls 62, 64, 66, 68 may be formed in the same manner as any of those shown in FIGS. 2-15 on the lower surface 60b. The three-dimensional shape on the inner side surfaces 62d, 64d, 66d, 68d of side walls 62, 64, 66, 68 may be formed as a single surface which is convex or generally convex, or concave or generally concave. Mesh (not shown) may be provided on the inner side surfaces 62d, 64d, 66d, 68d of the cover 60 and overlays portions of the three dimensional shapes on the inner side surfaces 62d, 64d, 66d, 68d of the side walls 62, 64, 66, 68. In some embodiments where the inner side surfaces 62d, 64d, 66d, 68d of the side walls 62, 64, 66, 68 have the three-dimensional shapes formed thereon, if a violator grinds a side wall 62, 64, 66, 68 from its outer side surface 62c, 64c, 66c, 68c toward its inner side surface 62d, 64d, 66d, 68d, the violator will not be able to expose the entire surface of the mesh on the side wall 62, 64, 66, 68 at the same time, nor will the violator be able to expose a substantial portion of the mesh at the same time, since only parts of the mesh will be exposed as the side wall 62, 64, 66, 68 is ground down. As a result, the mesh on the side wall 62, 64, 66, 68 cannot be peeled away from the side wall 62, 64, 66, 68, nor can a violator easily determine where to drill between the adjacent traces in the mesh 54 in the side wall 62, 64, 66, 68.

In an embodiment, an overlay (not shown) is provided on the inner surface of the mesh on the side walls 62, 64, 66, 68 and the exposed inner side surfaces 62d, 64d, 66d, 68d of the three-dimensional shapes. In an embodiment, the overlay has a secondary mesh (not shown) formed on its inner surface which is in communication with the electronic circuitry 56. The secondary mesh on the overlay may be formed in a pattern that is different than the pattern the first mesh is provided in, such that if a violator attempts to drill between the spaces in the pattern of the first mesh, that the violator then interrupts the second pattern.

The use of the terms "a" and "an" and "the" and "at least one" and similar references in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All processes described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A payment reader comprising:
a housing having an upper end;
a non-conductive cover which is configured to at least partially cover the upper end of the housing, the non-conductive cover having an upper wall and interconnected side walls depending downwardly from the upper wall and forming an internal compartment, the upper wall having an x-axis dimension and a y-axis dimension which define an x-y plane, the upper wall having an z-axis dimension which is perpendicular to the x-y plane, the upper wall having an upper surface and an opposite lower surface, the lower surface facing the internal compartment, the lower surface defining a surface area, wherein the entire surface area of the lower surface is formed of at least one three-dimensional shape which extends outwardly from the x-y plane in the z-direction;

electronic circuitry within the internal compartment and surrounded by the cover; and a mesh of conductive traces provided on the lower surface of the cover and in communication with the electronic circuitry.

2. The payment reader of claim 1, wherein the at least one three-dimensional shape is formed as a plurality of surfaces which are angled relative to each other.

3. The payment reader of claim 2, wherein the surfaces are formed of one of:
   a) planar surfaces, each of which is angled relative to each other, angled relative to the z-axis, and angled relative to the x-y plane,
   b) surfaces which are curved relative to the x-y plane and at an angle relative to the z-axis, and
   c) a combination of the planar and curved surfaces.

4. The payment reader of claim 1, wherein the at least one three-dimensional shape is formed as a single bump.

5. The payment reader of claim 4, wherein the bump is formed of one of:
   a) planar surfaces, each of which is angled relative to each other, angled relative to the z-axis, and angled relative to the x-y plane,
   b) surfaces which are curved relative to the x-y plane and at an angle relative to the z-axis, and
   c) a combination of the planar and curved surfaces.

6. The payment reader of claim 5, wherein the curved surfaces are one of generally convex and generally concave.

7. The payment reader of claim 5, wherein ones of the curved surfaces are generally convex and ones of the surfaces are generally concave.

8. The payment reader of claim 4, wherein the bump is formed of a surface which is curved relative to the x-y plane.

9. The payment reader of claim 1, wherein the at least one three-dimensional shape is formed as a plurality of bumps.

10. The payment reader of claim 9, wherein each bump is formed of one of:
    a) planar surfaces, each of which is angled relative to each other, angled relative to the z-axis, and angled relative to the x-y plane,
    b) surfaces which are curved relative to the x-y plane and at an angle relative to the z-axis, and
    c) a combination of the planar and curved surfaces.

11. The payment reader of claim 10, wherein ones of the curved surfaces are generally convex and ones of the surfaces are generally concave.

12. The payment reader of claim 10, wherein the curved surfaces are generally convex and generally concave.

13. The payment reader of claim 10, wherein the bumps are generally formed in rows and columns.

14. The payment reader of claim 10, wherein the bumps are not formed in rows and columns.

15. The payment reader of claim 9, wherein the bumps are generally formed in rows and columns.

16. The payment reader of claim 9, wherein the bumps are not formed in rows and columns.

17. The payment reader of claim 1, wherein the at least one three-dimensional shape is formed in an undulating pattern and include a plurality of curved surfaces.

18. The payment reader of claim 1, wherein each side wall has an inner side surface which faces the internal compartment, each inner side surface defining a surface area, wherein the entire surface area of each inner side surface is formed of at least one three-dimensional shape.

19. The payment reader of claim 18, wherein the at least one three-dimensional shape on each inner side surface is formed as a generally curved surface.

20. The payment reader of claim 1, wherein the mesh of conductive traces is formed as a pair of traces.

* * * * *